US011879308B2

(12) United States Patent
Romer et al.

(10) Patent No.: US 11,879,308 B2
(45) Date of Patent: Jan. 23, 2024

(54) METHODS FOR IN-SITU APPLICATION OF A COATING AGENT TO PRODUCTION TUBING USING A PLUNGER LIFT SYSTEM

(71) Applicant: ExxonMobil Technology and Engineering Company, Spring, TX (US)

(72) Inventors: Michael C. Romer, The Woodlands, TX (US); Giovanni A. Grasso, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 17/811,101

(22) Filed: Jul. 7, 2022

(65) Prior Publication Data
US 2023/0041390 A1    Feb. 9, 2023

Related U.S. Application Data

(60) Provisional application No. 63/260,084, filed on Aug. 9, 2021.

(51) Int. Cl.
*E21B 37/06*    (2006.01)
*E21B 34/00*    (2006.01)
(Continued)

(52) U.S. Cl.
CPC ............ *E21B 37/06* (2013.01); *E21B 33/124* (2013.01); *E21B 34/00* (2013.01); *E21B 41/02* (2013.01); *E21B 43/122* (2013.01)

(58) Field of Classification Search
CPC .......... E21B 37/00; E21B 37/06; E21B 37/12; E21B 37/10
See application file for complete search history.

(56) References Cited

U.S. PATENT DOCUMENTS 3,583,489 A * 6/1971 Hutchison ............... E21B 37/00
134/7
5,056,599 A    10/1991 Comeaux et al.
(Continued)

FOREIGN PATENT DOCUMENTS

WO    2015042488 A2    3/2015

OTHER PUBLICATIONS

"International Search Report and Written Opinion Issued in PCT Application No. PCT/US2020/073489", dated Sep. 27, 2022, 11 Pages.

*Primary Examiner* — Blake Michener
*Assistant Examiner* — Yanick A Akaragwe
(74) *Attorney, Agent, or Firm* — ExxonMobil Technology and Engineering Company—Law Department

(57) ABSTRACT

Methods for the in-situ application of coating agent to production tubing within wellbores using plunger lift systems are provided herein. One method includes shutting in the wellbore, pressurizing the production tubing to displace fluids from the production tubing, and dropping a plunger from the surface into the production tubing such that the plunger travels toward the bottom of the production tubing until landing on a bumper spring. The method also includes pumping a predetermined amount of the coating agent from the surface into the production tubing such that the coating agent flows to the bottom of the production tubing and settles on top of the plunger and utilizing the differential pressure between the production tubing and the annulus to return the plunger and the coating agent to the surface, where the coating agent is applied to the inner diameter of the production tubing as it flows toward the surface.

16 Claims, 4 Drawing Sheets

(51) Int. Cl.
   *E21B 43/12*   (2006.01)
   *E21B 33/124*   (2006.01)
   *E21B 41/02*   (2006.01)

(56) References Cited

U.S. PATENT DOCUMENTS

| | | | | |
|---|---|---|---|---|
| 7,080,692 | B1* | 7/2006 | Kegin | E21B 43/121 |
| | | | | 166/372 |
| 10,822,926 | B2 | 11/2020 | Wang et al. | |
| 2003/0145986 | A1* | 8/2003 | Evans | E21B 47/008 |
| | | | | 166/250.15 |
| 2006/0278359 | A1* | 12/2006 | Wheaton | B01D 53/0476 |
| | | | | 162/256 |
| 2007/0039739 | A1* | 2/2007 | Wilson | E21B 33/068 |
| | | | | 166/105 |
| 2009/0321083 | A1* | 12/2009 | Schinagl | E21B 43/121 |
| | | | | 166/372 |
| 2013/0014950 | A1* | 1/2013 | Dickinson | E21B 21/16 |
| | | | | 166/305.1 |
| 2019/0330939 | A1* | 10/2019 | Fontenot | E21B 21/08 |
| 2021/0189807 | A1* | 6/2021 | Perez | B21C 37/083 |

\* cited by examiner

METHODS FOR IN-SITU APPLICATION OF A COATING AGENT TO PRODUCTION TUBING USING A PLUNGER LIFT SYSTEM

CROSS-REFERENCE TO RELATED APPLICATIONS

This application claims the benefit of U.S. Provisional Application Ser. No. 63/260,084, filed Aug. 9, 2021, the disclosure of which is hereby incorporated by reference in its entirety.

FIELD OF THE INVENTION

The techniques described herein relate to the hydrocarbon production field. More specifically, the techniques described herein relate to methods for the in-situ application of coating agents to production tubing within plunger-lifted wells using corresponding plunger lift systems.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

Throughout the lifetime of a hydrocarbon well, the production tubing associated with the wellbore is susceptible to various flow assurance issues. In particular, the production tubing is prone to corrosion of the production tubing material (e.g., typically steel) and fouling, which refers to the formation and accumulation of unwanted deposits of impurities, such as mineral scale, asphaltenes, paraffin wax, and/or hydrates, along the inner diameter (ID) of the production tubing during hydrocarbon production operations. Such corrosion and fouling can, in turn, result in increased frictional resistance to the flow of hydrocarbon fluids through the production tubing. As a result, production chemicals are commonly injected into the production tubing to prevent such impurities from adhering to the ID of the production tubing, and/or to remove impurities that have already adhered to the ID of the production tubing. In addition, drag-reducing agents, demulsifiers, surfactants, and the like are commonly injected into the production tubing to reduce the frictional resistance encountered by the produced hydrocarbon fluids. Moreover, downhole heating is sometimes applied to the production tubing to reduce the likelihood of hydrate and/or paraffin wax formation. Furthermore, electrical signals are sometimes applied to the production tubing in an effort to prevent mineral scale deposition. However, when these preventative measures fail, wellwork may be required to clean the ID of the production tubing. Such wellwork always carries a risk of lost tools, potential wellbore damage, and environmental exposure. In addition, such wellwork can be costly, particularly if fishing is required.

Another means of protecting the production tubing from flow assurance issues is to install a liner within the production tubing. The liner, which is typically thermoplastic, is attached to the ID of the production tubing during the manufacturing process, and the production tubing is then installed as usual. During hydrocarbon production operations, the liner reduces frictional resistance to flow within the production tubing, protects the production tubing material from corrosion, and impedes the deposition of impurities along the ID of the production tubing. However, although such lined production tubing is generally effective for such purposes, it has several drawbacks. In particular, the inclusion of the liner reduces the effective ID of the production tubing. In addition, the liner is prone to damage from scratching or other mechanical impacts during wellwork and/or production operations (such as, in particular, artificial lift operations). Moreover, manufacturing defects may result in the liner including weak points (e.g., holes and/or inclusions) that negatively impact the liner's overall performance.

SUMMARY OF THE INVENTION

An embodiment described herein provides a method for in-situ application of a coating agent to a production tubing within a wellbore using a plunger lift system. The method includes shutting in the wellbore, pressurizing the production tubing to displace fluids from the production tubing, and dropping a plunger from the surface into the production tubing such that the plunger travels toward the bottom of the production tubing until landing on a bumper spring. The method also includes pumping a predetermined amount of the coating agent from the surface into the production tubing such that the coating agent flows to the bottom of the production tubing and settles on top of the plunger, as well as utilizing the differential pressure between the production tubing and an annulus of the wellbore to return the plunger and the coating agent to the surface, where the coating agent is applied to the inner diameter (ID) of the production tubing as the coating agent flows toward the surface.

Another embodiment described herein provides a method for in-situ application of a coating agent to a production tubing within a wellbore using a plunger lift system. The method includes closing a surface valve to halt fluid flow from the wellbore, pressurizing the production tubing to displace fluids within the production tubing to below a bumper spring positioned toward the bottom of the production tubing, and maintaining the pressure on the production tubing to prevent fluid inflow into the production tubing. The method also includes dropping a first plunger from the surface into the production tubing such that the first plunger travels toward the bottom of the production tubing until landing on the bumper spring, pumping a predetermined amount of the coating agent from the surface into the production tubing such that the coating agent flows to the bottom of the production tubing and settles on top of the first plunger, and dropping a second plunger from the surface into the production tubing such that the second plunger travels toward the bottom of the production tubing and acts as a cap for the coating agent. The method further includes opening the surface valve to enable a differential pressure between the production tubing and an annulus of the wellbore to drive the first plunger, the coating agent, and the second plunger to the surface in a manner that provides for in-situ application of the coating agent to the inner diameter of the production tubing, re-pressurizing the production tubing to prevent fluid inflow into the production tubing, and allowing the coating agent to dry/cure for a predetermined drying/curing time.

These and other features and attributes of the disclosed embodiments of the present disclosure and their advantageous applications and/or uses will be apparent from the detailed description which follows.

BRIEF DESCRIPTION OF THE DRAWINGS

To assist those of ordinary skill in the relevant art in making and using the subject matter thereof, reference is made to the appended drawings, wherein.

Figure 1:
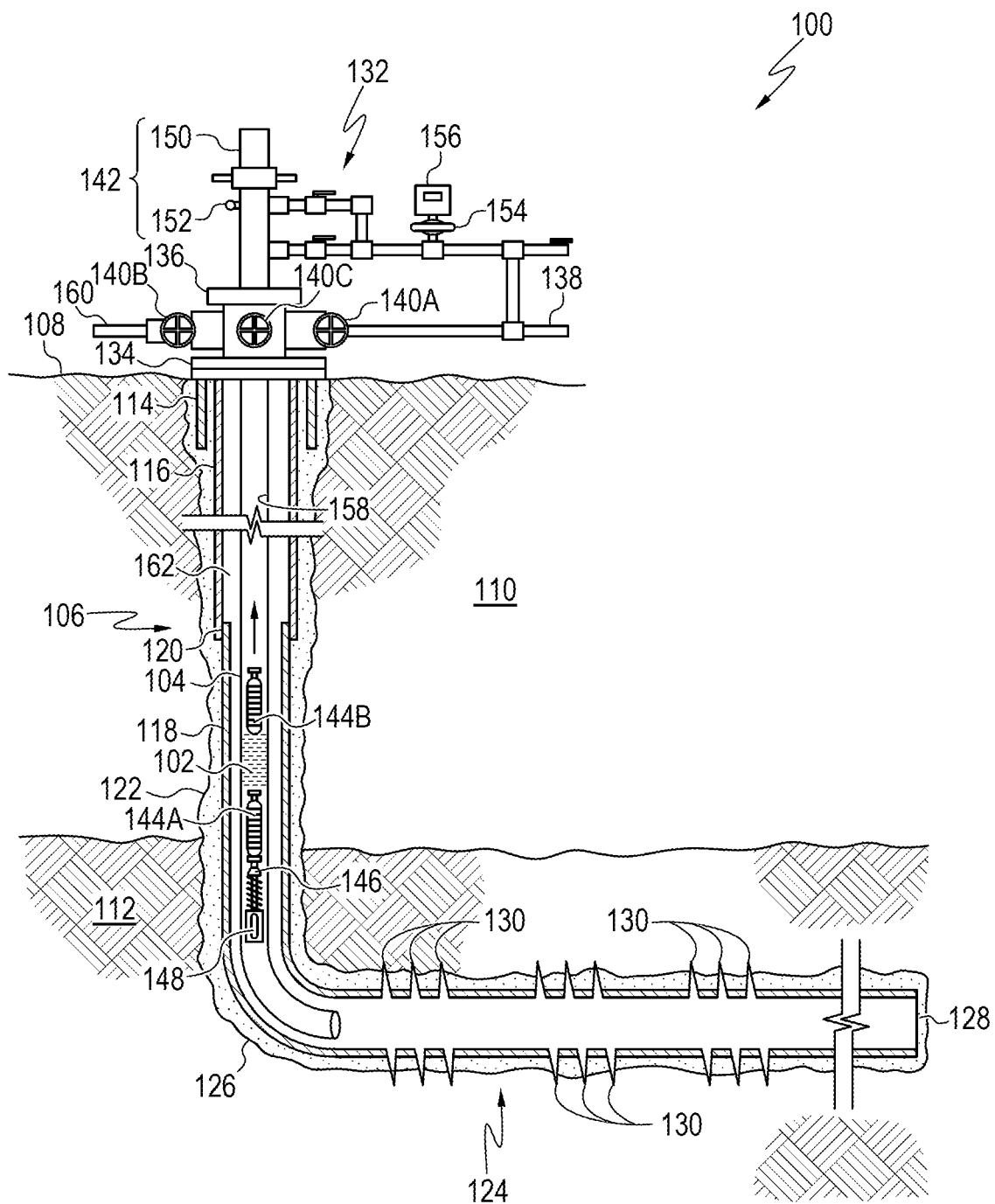
FIG. 1 is a schematic view of an exemplary hydrocarbon well that utilizes a plunger lift system to apply a coating agent to the production tubing in-situ according to embodiments described herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases and liquids, as well as to combinations of gases and liquids, combinations of gases and solids, combinations of liquids and solids, and combinations of gases, liquids, and solids.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "gas lift system" is a type of artificial lift system used to remove completion fluids from a well and/or to increase the performance of the well. The gas lift system generally includes a valve system for controlling the injection of compressed, or pressurized, gas from a source external to the well, such as a compressor, into the borehole. The increased pressure from the injected gas forces accumulated formation fluid up the tubing to remove the fluids as production flow or to clear the fluids and restore the free flow of gas from the formation into the well.

A "gas lift valve" is a valve used in a gas lift system to control the flow of lift gas into the production tubing conduit. Operation of the gas lift valve may be determined by preset opening and closing pressures in the tubing or annulus, depending on the specific application. A reverse-flow check valve may or may not be integral to the gas lift valve.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_2$, $C_2H_4$, $C_2H_6$, $C_3$ isomers, $C_4$ isomers, benzene, and the like.

A "plunger lift system" is a type of artificial lift system that is typically used to unload relatively small volumes of liquid from gas-dominated wells. A plunger lift system includes an automated control system mounted on the wellhead that controls the well on an intermittent flow regime. When the well is shut-in, a plunger is dropped down the production tubing. Then, when the control system opens the well for production, the plunger and a column of fluid are carried up the production tubing to the surface. A plunger lift system also includes a surface receiving mechanism at the wellhead that detects the plunger when it arrives and, through the control system, prepares for the next cycle.

Relatedly, the term "gas-assisted plunger lift (GAPL) system" (sometimes referred to as a "plunger-assisted gas lift (PAGL) system") refers to a combination of a plunger lift system and a gas lift system. GAPL systems are typically employed when the reservoir pressure within the wellbore has declined to the point where shut-ins of several days or weeks are required to build up enough pressure to return the plunger to the surface. The plunger-lift portion of the GAPL system is typically a standard plunger lift system. The gas-lift portion of the GAPL system may be a standard gas lift system including gas lift valves, which are typically installed in conventional mandrels or specialized side-pocket mandrels that do not affect the inner diameter of the production tubing and are, thus, compatible with the plunger lift system. Alternatively, the gas-lift portion of the GAPL system may include a packerless, "poor-boy" design, in which the lift gas is forced down the annulus and all the way to the bottom of the wellbore, where it enters around the end of the production tubing and then travels back up to the surface. In either case, the injected lift gas typically creates enough gas velocity and pressure (along with the reservoir pressure below the plunger) to assist the plunger and the accumulated hydrocarbon fluids in traveling up to the surface.

As used herein, the term "pill" refers to a relatively-small fluid volume, such as, for example, a fluid volume of around 100 gallons to around 1,000 gallons.

The term "production tubing" refers to a wellbore tubular used to produce hydrocarbon fluids from a reservoir.

The term "wellbore" refers to a borehole drilled into a subterranean formation. The borehole may include vertical, deviated, highly deviated, and/or horizontal sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by those skilled in the art.

Furthermore, concentrations, dimensions, amounts, and/or other numerical data that are presented in a range format are to be interpreted flexibly to include not only the numerical values explicitly recited as the limits of the range, but also all individual numerical values or sub-ranges encompassed within that range, as if each numerical value and sub-range were explicitly recited. For example, a disclosed numerical range of 1 to 200 should be interpreted to include, not only the explicitly-recited limits of 1 and 200, but also individual values, such as 2, 3, 4, 197, 198, 199, etc., as well as sub-ranges, such as 10 to 50, 20 to 100, etc.

As described above, hydrocarbon production operations are often negatively impacted by flow assurance issues within the production tubing. Such flow assurance issues include, for example, corrosion of the production tubing material (e.g. typically steel) and fouling (e.g., the accumulation of various impurities, such as mineral scale, asphaltenes, paraffin wax, and/or hydrates, along the ID of the production tubing). Such flow assurance issues may, in turn, result in reduced wellbore productivity as a result of the increased frictional resistance to the flow of the hydrocarbon fluids through the production tubing. Moreover, as described above, conventional techniques for remediating such flow assurance issues involve several drawbacks.

Accordingly, embodiments described herein provide improved techniques for protecting production tubing from such flow assurance issues through the in-situ application of coating agents to production tubing using plunger lift techniques. More specifically, embodiments described herein provide methods for applying a coating agent (such as an omniphobic, low-energy coating agent) to installed production tubing on demand using one or more plungers corresponding to a plunger lift system. In various embodiments, such in-situ coating methods are performed at engineered intervals to ensure that the coating agent remains in proper condition to perform as desired. Moreover, in various embodiments, such in-situ coating methods address the aforementioned flow assurance issues at lower cost and minimal risk and, therefore, are capable of supplementing or replacing conventional techniques. As an example, in some embodiments, the in-situ coating methods described herein are utilized in lieu of a lined production tubing when there is not enough production history to properly select a suitable type of liner. As another example, in some embodiments, the in-situ coating methods described herein are utilized to avoid expenses associated with purchasing and installing equipment (such as pumps, controllers, tanks, and downhole lines and valves) for injecting production chemicals into the production tubing. As another example, in some embodiments, the in-situ coating methods described herein are utilized in addition to any number of conventional techniques (e.g., techniques for lining the production tubing and/or techniques for injecting production chemicals into the production tubing) to further enhance the performance of the production tubing.

As described further herein, the in-situ coating methods provided herein utilize an existing or newly-installed plunger lift system corresponding to the hydrocarbon well to apply the coating agent to the production tubing. As will be appreciated by those skilled in the art, plunger lift is a form of artificial lift that is typically used to deliquefy gas-dominated, onshore wells. In particular, plunger lift is used to periodically unload relatively small volumes of fluid from the production tubing by carrying such fluid to the surface. During plunger operations, a small metal cylinder (referred to as a "plunger") travels vertically along the production tubing within the wellbore. The plunger is designed to force the hydrostatic head up the wellbore and to the surface in response to the build-up of reservoir pressure. In operation, the plunger travels between the wellhead and a downhole bumper spring in a cyclic fashion. As the plunger travels through the wellbore, it provides a barrier that inhibits gas breakthrough and effectively carries a liquid slug to the surface. The differential pressure created by this action assists the well in lifting liquids to the surface with lower gas velocities than those normally reached. This mitigates the cost of installing production tubing with a smaller inner diameter (ID) to increase the gas velocity.

In a conventional plunger lift system, a wellhead including a specialized extension referred to as a "lubricator" is provided at the surface. The lubricator typically includes an energy-absorbing spring and a catch. In normal operation, the plunger rests in the lubricator (or in a pup joint) at the surface above the wellhead valves. When suitable plunger lift conditions are detected (e.g., via surface measurements and gauges), the well is typically shut in, and the lubricator drops the plunger into the wellbore. After a sufficient measured (or estimated) time, the well is brought back into production, causing the plunger to travel back to the surface along with the accumulated fluids. Moreover, as the plunger approaches the surface, the spring within the lubricator absorbs the mechanical impact of the plunger, while the catch maintains the plunger within the lubricator to allow fluids to flow more freely from the well.

More recently, a form of artificial lift referred to as "gas-assisted plunger lift," or "GAPL," has been developed. GAPL utilizes a combination of plunger lift and gas lift techniques to assist the plunger and the accumulated fluids in traveling up to the surface, particularly for aging wellbores that have experienced a significant decline in reservoir pressure. Currently, it is typical for GAPL to be implemented in a packerless, "poor-boy" design, in which the lift gas is forced down the annulus and all the way to the bottom of the well, where it enters around the end of the production tubing and then travels back up to the surface. However, the poor-boy GAPL design is notably inefficient since there is little control over the injected gas rates at the lift point. Furthermore, the injection of the gas at the bottom of the well may create a potentially-undesirable build-up of well pressure. As a result, GAPL is sometimes implemented by installing conventional mandrels on the production tubing (or utilizing already-installed conventional mandrels for wells that have previously benefited from gas lift techniques). In particular, the conventional mandrels may be welded to the outer diameters of the production tubing with integral gas lift valves such that the ID of the production tubing is not altered. Standard gas lift principles may then be used to assist with returning the plunger to the surface. Importantly, the plunger can operate as designed in both the poor-boy and conventional-mandrel configurations since there are no changes to the internal dimensions of the production tubing.

As described further herein, the in-situ coating methods provided herein can be performed using either a conventional plunger lift system or a GAPL system. In either case, such methods include (but are not limited to) dropping a plunger into the production tubing, pumping a predetermined amount of the desired coating agent into the production tubing, and (optionally) dropping a second plunger (or pumping a buffer of gas and/or liquid) into the production tubing to act as a cap for the coating agent. The methods further include utilizing the differential pressure between the production tubing and the annulus of the wellbore to return the plunger(s) and the coating agent to the surface (e.g., in the case of a GAPL system, with the assistance of the lift gas flowing through the production tubing) in a manner that optimizes the application of the coating agent to the ID of the production tubing, as well as allowing the coating agent to dry/cure for a predetermined drying/curing time before putting the well back into production.

In various embodiments, utilization of a plunger lift system for the in-situ application of the coating agent to the production tubing is particularly advantageous for several reasons, including (but not limited to) the fact that plunger lift is the most economical form of artificial lift, and many hydrocarbon wells include already-installed plunger lift systems. Accordingly, minimal additional equipment and associated costs are required to implement the in-situ coating methods described herein using such plunger lift systems. In addition, according to embodiments described herein, the coating agent can be applied in-situ and on demand, thus providing significant flexibility for addressing flow assurance issues during hydrocarbon production operations. Furthermore, the coating agent that is applied according to embodiments described herein is highly effective at preventing and/or mitigating various flow assurance issues, including corrosion, fouling, and the associated increased frictional resistance to flow. Therefore, the in-situ coating methods described herein enable a number of flow assurance issues to be simultaneously addressed in a fast, efficient, and cost-effective manner.

Exemplary Hydrocarbon Wells Utilizing Plunger Lift Systems for In-Situ Application of Coating Agent to Production Tubing FIG. 1 is a schematic view of an exemplary hydrocarbon well 100 that utilizes a plunger lift system to apply a coating agent 102 to the production tubing 104 in-situ according to embodiments described herein. The hydrocarbon well 100 includes a wellbore 106 that extends from the surface 108 into a subsurface formation 110 that is composed of several subsurface intervals, including a hydrocarbon-bearing interval (or reservoir) 112. The wellbore 106 has been completed by setting a series of tubulars into the subsurface formation 110. These tubulars include several strings of casing, such as a surface casing string 114, an intermediate casing string 116, and a production casing string 118, which is sometimes referred to as a "production liner." In some embodiments, additional intermediate casing strings (not shown) are also included to provide support for the walls of the wellbore 106. According to the embodiment shown in FIG. 1, the surface casing string 114 and the intermediate casing string 116 are hung from the surface 108, while the production casing string 118 is hung from the bottom of the intermediate casing string 116 using a liner hanger 120.

The surface casing string 114 and the intermediate casing string 116 are set in place using cement 122. The cement 122 isolates the intervals of the subsurface formation 110 from the wellbore 106 and each other. The production casing string 118 may also be set in place using cement 122, as shown in FIG. 1. Alternatively, the wellbore 106 may be set as an open-hole completion, meaning that the production casing string 118 is not set in place using cement.

According to the embodiment shown in FIG. 1, the wellbore 106 is completed with a horizontal (or lateral) section 124. The lateral section 124 has a heel 126 and a toe 128 that extends through the reservoir 112 within the subsurface formation 110. However, those skilled in the art will appreciate that the wellbore 106 may also include any number of additional or alternative vertical, lateral, deviated, and/or highly-deviated sections extending in various directions through the subsurface formation 110, depending on the details of the particular implementation.

As shown in FIG. 1, the lateral section 124 of the production casing string 118 includes a number of perforations 130 that allow hydrocarbon fluids from the reservoir 112 to flow into the wellbore 106 via corresponding fractures (not shown) within the reservoir 112. While only three sets of perforations 130 are shown in FIG. 1, those skilled in the art will appreciate that laterally-completed wellbores typically extend for some length, such as, of example, for a length of one, two, or even more miles, and include multiple stages of perforations. In addition, those skilled in the art will appreciate that the near-wellbore region of the reservoir 112 is fractured through each set of perforations using any of various hydraulic fracturing techniques, such as, for example, plug-and-perforation (or "plug-and-perf") techniques.

The hydrocarbon well 100 also includes a wellhead 132 located at the surface 108. The wellhead 132 includes any suitable arrangement of pipes, valves, and other equipment for controlling the operation of the hydrocarbon well 100. For example, the wellhead 132 includes a casing head 134 and a tubing head 136. In addition, the wellhead 132 includes an attached sales line 138, as well as a number of surface valves (sometimes referred to as "wing valves") 140A and 140B and a master valve 140C that provides a means of shutting in the wellbore 106 when desired. Furthermore, because the hydrocarbon well 100 is a plunger-lifted well, the wellhead 132 includes a specialized lubricator 142 that is configured to control the movement of one or more plungers 144A and 144B up and down the production tubing 104 within the wellbore 106. In particular, when the lubricator 142 drops one of the plunger(s) 144A or 144B, the plunger 144A or 144B gravitationally falls into the production tubing 104 until it lands on a bumper spring 146, which rests on top of a tubing stop or standing valve 148 that permits fluids to flow into the production tubing 104 from below the bumper spring 146.

The lubricator 142 itself is defined by an elongated, sealed cylindrical pipe 150 including an energy-absorbing spring (not shown) and an optional plunger catch 152. The spring absorbs the mechanical impact of the plunger(s) 144A and 144B as they return to the surface 108, while the plunger catch 152 maintains a plunger 144A or 144B (i.e., the second plunger 144B for embodiments in which two plungers are utilized) within the lubricator 142. In addition, the wellhead 132 includes a motor valve 154 and a controller 156 that assist in controlling various wellhead functions, including the cycle for dropping the plunger(s) 144A and 144B. The controller 156 may include, for example, an electronic controller, a dedicated controller, a special-purpose controller, a personal computer, a special-purpose computer, a display device, a logic device, and/or a memory device. Moreover, in various embodiments, the controller 156 and any number of other wellhead components are communicably coupled to one or more local and/or remote computing systems (not shown) that control the operation of the controller 156 and the other wellhead components.

According to embodiments described herein, the plunger(s) 144A and 144B are utilized for the in-situ application of the coating agent 102 to the inner diameter (or inner wall) 158 of the production tubing 104. In particular, in some embodiments, the hydrocarbon well 100 is first shut-in via closure of one or more surface valves 140A and/or 140B, and the hydrocarbon fluids (and/or other types of fluids) within the production tubing 104 are then displaced back into the reservoir 112 using liquid hydrostatic or gas pressure (e.g., by injecting natural gas, nitrogen, and/or carbon dioxide into the production tubing 104). Specifically, in various embodiments, the fluids are displaced to below the bumper spring 146, and/or the wellbore 106 is pressurized to the limit of the pressure-relieving standing valve 148. In some embodiments, an acoustic device (not shown) is then used to determine the fluid level within the production tubing 104 and to ensure that the production tubing 104 is clear of fluids to the desired depth (e.g., to below the bumper spring 146). Moreover, in various embodiments, the applied displacement pressure is maintained on the production tubing 104 to prevent any fluid from flowing into the production tubing 104 during the coating process.

The lubricator 142 then drops the first plunger 144A into the production tubing 104. This is followed by the injection of a pill of the coating agent 102 into the production tubing 104. In particular, in various embodiments, a predetermined amount of the coating agent 102 is pumped out of a liquid storage tank or vessel (not shown) and into the production tubing 104 via any of one or more fluid injection lines 160 that are operatively coupled to the wellhead 132. Moreover, as shown in FIG. 1, once the injected coating agent 102 reaches the bottom of the wellbore 106, the tubing stop or standing valve 148 (in combination with the first plunger 144A) maintains the coating agent 102 within the production tubing 104, thus preventing the coating agent 102 from flowing into the reservoir 112.

In some embodiments, the injection of the coating agent 102 is followed by the injection of a buffer of gas and/or liquid into the production tubing 104 via any of the fluid injection line(s) 160. However, according to the embodiment shown in FIG. 1, the injection of the coating agent 102 is instead followed by the dropping of the second plunger 144B into the production tubing 104. In this embodiment, the second plunger 144B acts as a cap for the injected coating agent 102. Moreover, in some embodiments, the fall time for the second plunger 144B is estimated using the acoustic device (or any other suitable downhole tool). This may help to determine when the second plunger 144B has come to rest on top of the column of the coating agent 102.

In some embodiments, any suitable types of enhancement fluids are injected into the production tubing 104 before and/or after the injection of the coating agent 102 to improve the overall effectiveness of the coating process. Such enhancement fluids may include, for example, one or more acidic solutions (e.g., solutions including hydrochloric acid and/or hydrofluoric acid), one or more surfactants, and/or one or more flow assurance chemicals, such as those used to remove scale, asphaltenes, wax, and the like from the ID of the production tubing 104. In addition, such enhancement fluids may include water (or a water-based fluid) that is used to flush other types of fluids out of the wellbore 106 before and/or after the coating process.

In various embodiments, once the plunger(s) 144A and 144B have reached the bumper spring 146, the hydrocarbon well 100 remains shut-in for a measured (or estimated)

period of time to allow the sufficient build-up of differential pressure between the inside of the production tubing 104 and the surrounding annulus 162 (e.g., the area between the outer wall of the production tubing 104 and the inner wall of the casing strings 114, 116, and 118) to effectively return the plunger(s) 144A and 144B to the surface 108. In some embodiments, this differential pressure increase is controlled such that the speed of the plunger(s) 144A and 144B is dynamically adjusted to attain a predetermined "soak time" for the coating agent 102 per distance traveled within the production tubing 104, thus ensuring that the coating agent 102 is properly applied to the ID 158 of the production tubing 104 as it is carried back toward the surface 108 by the plunger(s) 144A and 144B. For example, in some embodiments, the differential pressure increase is controlled by adjusting the shut-in time, applying surface choke techniques, and/or using any other suitable types of pressure-controlling techniques. Moreover, as described further with respect to FIG. 2, gas lift techniques may sometimes be used to further control the differential pressure.

Furthermore, in various embodiments, once the plunger(s) 144A and 144B reach the lubricator 142 at the surface 108, the production tubing 104 is repressurized to prevent fluid inflow into the production tubing 104, and the acoustic device may optionally be used to determine the fluid level within the production tubing 104 and to ensure that the production tubing 104 is clear of fluids to the desired depth (e.g., to below the bumper spring 146). The coating agent 102 that has been applied to the ID of the production tubing 104 is then allowed to dry or cure for a predetermined amount of time. This drying/curing time may be on the order of hours to days, depending on the details of the particular implementation. In some embodiments, the drying/curing of the coating agent 102 is accelerated by injecting dry gas (such as nitrogen) into the production tubing 104, as described further with respect to FIG. 2.

After the predetermined drying/curing time, the surface valve(s) 140A and/or 140B may be opened to bring the hydrocarbon well 100 back into production, and any remaining, exhausted coating agent 102 may be produced down a flowline or captured in a tank, vessel, or other storage or transportation device at the surface 108, depending on the details of the particular implementation. For example, in some embodiments, the exhausted coating agent 102 is captured within a tank, regenerated within a local or remote regeneration system, and then reused within the wellbore 106 (or another similar wellbore).

In some embodiments, the plungers(s) 144A and 144B are specifically selected from one or more plunger types that will optimize the coating process. For example, in such embodiments, the plunger(s) 144A and 144B may be pad-type plungers that are designed for low leakage, brush plungers that are designed for high-surface-area applications, and/or any other suitable types of plungers that will maximize the application of the coating agent 102 to the ID 158 of the production tubing 104. Moreover, for embodiments in which two plungers 144A and 144B are utilized, the second plunger 144B may be modified to include a higher sealing efficiency, a reduced weight, and/or other specialized features that will prevent the second plunger 144B from dropping through the coating agent 102 and landing on the first plunger 144A during the coating process.

In some embodiments, the production tubing 104 itself is preconditioned prior to the coating process to enhance the application of the coating agent 102 to the ID 158 of the production tubing 104. Such preconditioning may include, for example, techniques for scraping and/or roughening the inner-diameter surface of the production tubing 104 using any suitable downhole tools (not shown), which may be run into the wellbore 106 using slickline/wireline, coiled tubing, or other well intervention techniques. Additionally or alternatively, one or more specialized plungers (not shown) may be used to precondition the production tubing 104 by, for example, removing wax deposits and/or other impurities from the inner-diameter surface of the production tubing 104.

In various embodiments, the coating agent 102 utilized according to embodiments described herein is an omniphobic (e.g., water- and oil-resistant), low-energy coating material that is designed to improve flow assurance for tubulars by reducing corrosion, fouling, and frictional issues within such tubulars. In such embodiments, the coating agent 102 may be a water-based fluid that is effective for achieving the desired effect at an application thickness of less than 5 millimeters (e.g., in some cases, a thickness of only around 2 millimeters). However, those skilled in the art will appreciate that the coating agent 102 may additionally or alternatively include any other suitable type(s) of coating material(s) that are capable of preventing and/or mitigating flow assurance issues within tubulars.

According to the embodiment shown in FIG. 1, the hydrocarbon well 100 is a packerless well without a subsurface safety valve, which is generally preferable for wells including plunger lift systems. However, the in-situ coating techniques described herein can also be applied to wells including subsurface safety valves. In such embodiments, the effectively-treated area may be limited to the section of the production tubing that is between the bumper spring and the subsurface safety valve, as an "upside-down" bumper spring is typically set in the subsurface safety valve to act as a stop for the plunger. In addition, in such embodiments, the required pressure-buildup time may be longer since there are limited means for boosting the differential pressure from the surface.

Figure 2:
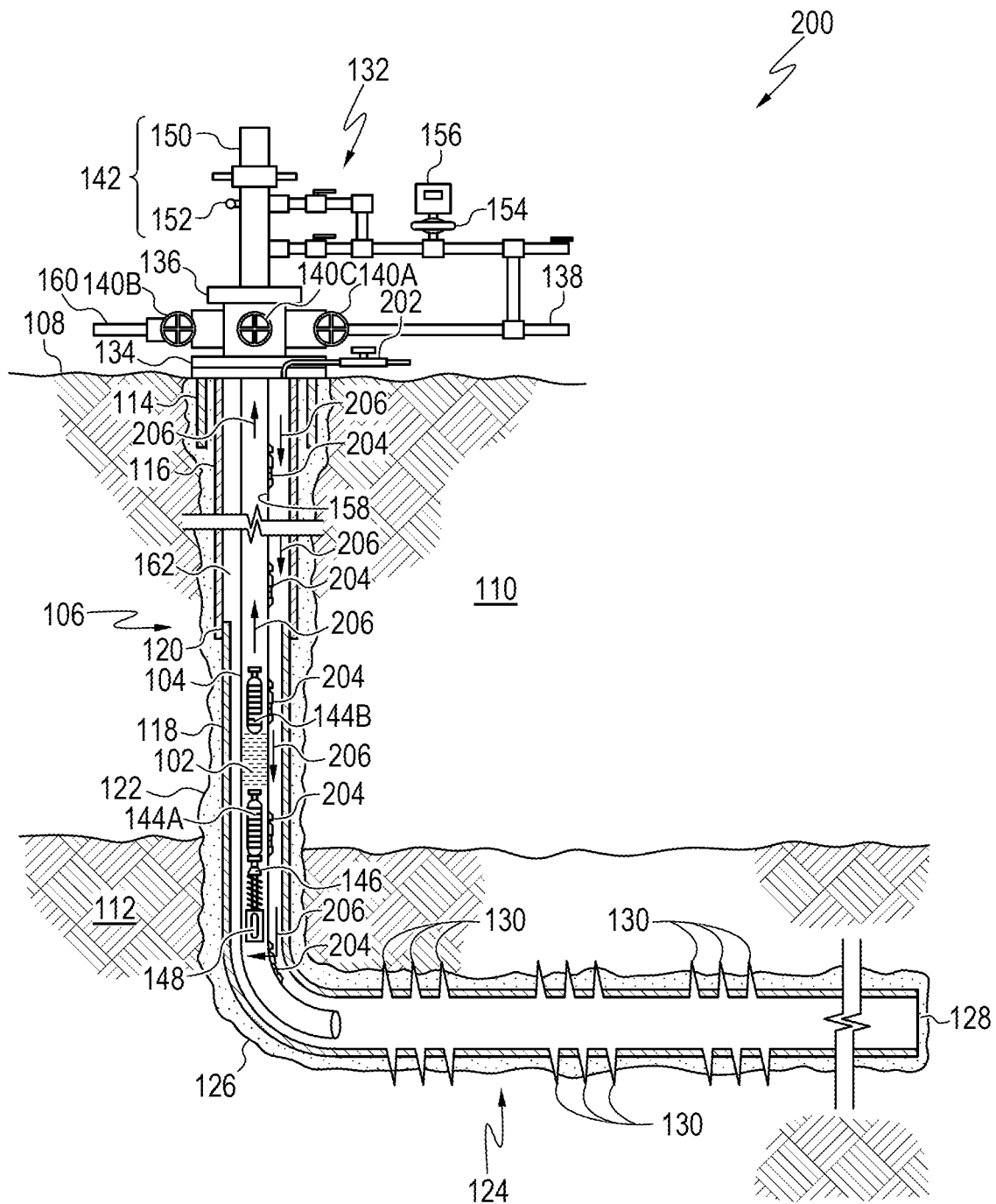
FIG. 2 is a schematic view of an exemplary hydrocarbon well that utilizes a gas-assisted plunger lift system to apply the coating agent to the production tubing in-situ according to embodiments described herein.

FIG. 2 is a schematic view of an exemplary hydrocarbon well 200 that utilizes a gas-assisted plunger lift system to apply the coating agent 102 to the production tubing 104 in-situ according to embodiments described herein. Like numbered items are as described with respect to FIG. 1. The hydrocarbon well 200 of FIG. 2 may be similar to the hydrocarbon well 100 of FIG. 1. However, within the hydrocarbon well 200 of FIG. 2, the wellhead 132 is modified to add an injection line 202 for injecting lift gases into the annulus 162, and the production tubing 104 is modified to add a number of conventional mandrels 204 for securing gas lift valves to the production tubing 104. In various embodiments, such lift gases are composed, at least in part, of light hydrocarbon gases that are separated from the produced hydrocarbon fluids and then injected back into the annulus 162.

For this conventional-mandrel GAPL configuration, the lift gas injected via the gas injection line 202 travels down the annulus 162 and enters the interior of the production tubing 104 via the operating gas lift valve, which is typically the gas lift valve positioned within the lowest (or most downhole-located) conventional mandrel 204 in the wellbore 106, as indicated by arrows 206. In various embodiments, the conventional mandrel 204 including the operating gas lift valve is located below the bumper spring 146. Therefore, as the lift gas enters the production tubing 104 and begins to flow toward the surface 108, it serves to reduce the hydrostatic head in the wellbore 106 and, in combination with the build-up of reservoir pressure below the bumper spring 146, forces the plunger(s) 144A and 144B and, thus, the coating agent 102 back toward the surface 108.

The GAPL configuration shown in FIG. 2 may be particularly beneficial for wells that have experienced a decline in reservoir pressure since, in some cases, shut-ins of several days or weeks may be required to build up enough pressure to return the plunger(s) 144A and 144B to the surface 108. Accordingly, the utilization of gas lift techniques to aid the plunger lift system in returning the plunger(s) 144A and 144B to the surface 108 enables the coating agent 102 to be quickly and efficiently applied to the production tubing 104 at any stage during the well's lifespan.

Furthermore, in various embodiments, the GAPL system shown in FIG. 2 is used to shorten the amount of time needed to dry or cure the coating agent 102 that is applied to the ID of the production tubing 104. In particular, in such embodiments, lift gas may be circulated through the production tubing 104 to aid in the drying/curing of the coating agent 102.

The schematic views of FIGS. 1 and 2 are not intended to indicate that the hydrocarbon wells 100 and 200, respectively, are to include all of the components shown in the figures. Moreover, any number of additional components may be included within the hydrocarbon well 100 and/or 200, depending on the details of the specific implementation. Furthermore, the schematic views of FIGS. 1 and 2 are not intended to indicate that the hydrocarbon wells 100 and 200, respectively, are limited to the configuration shown in the figures. Rather, the hydrocarbon well 100 and/or 200 can include any number of suitable alternative configurations that can be envisioned by those skilled in the art.

While a conventional-mandrel GAPL configuration is shown in FIG. 2, those skilled in the art will appreciate that the in-situ coating techniques described herein can also be implemented for other GAPL configurations. For example, the in-situ coating techniques may be used in conjunction with a "poor-boy" GAPL configuration, which is often used to quickly and inexpensively transform a plunger-lifted well into a gas-assisted plunger-lifted well. In such embodiments, the hydrocarbon well may be the same as (or similar to) the hydrocarbon well 100 of FIG. 1, with the addition of the gas injection line 202 shown in FIG. 2. In this configuration, the injected lift gas travels down the annulus 162 and around the end of the production tubing 104. From there, the lift gas travels through the tubing stop or standing valve 148 below the bumper spring 146 and up the production tubing 104, thereby reducing the hydrostatic head and, in combination with the build-up of reservoir pressure below the bumper spring 146, forcing the plunger(s) 144 and 144B and the coating agent 102 back toward the surface 108.

Figure 3:
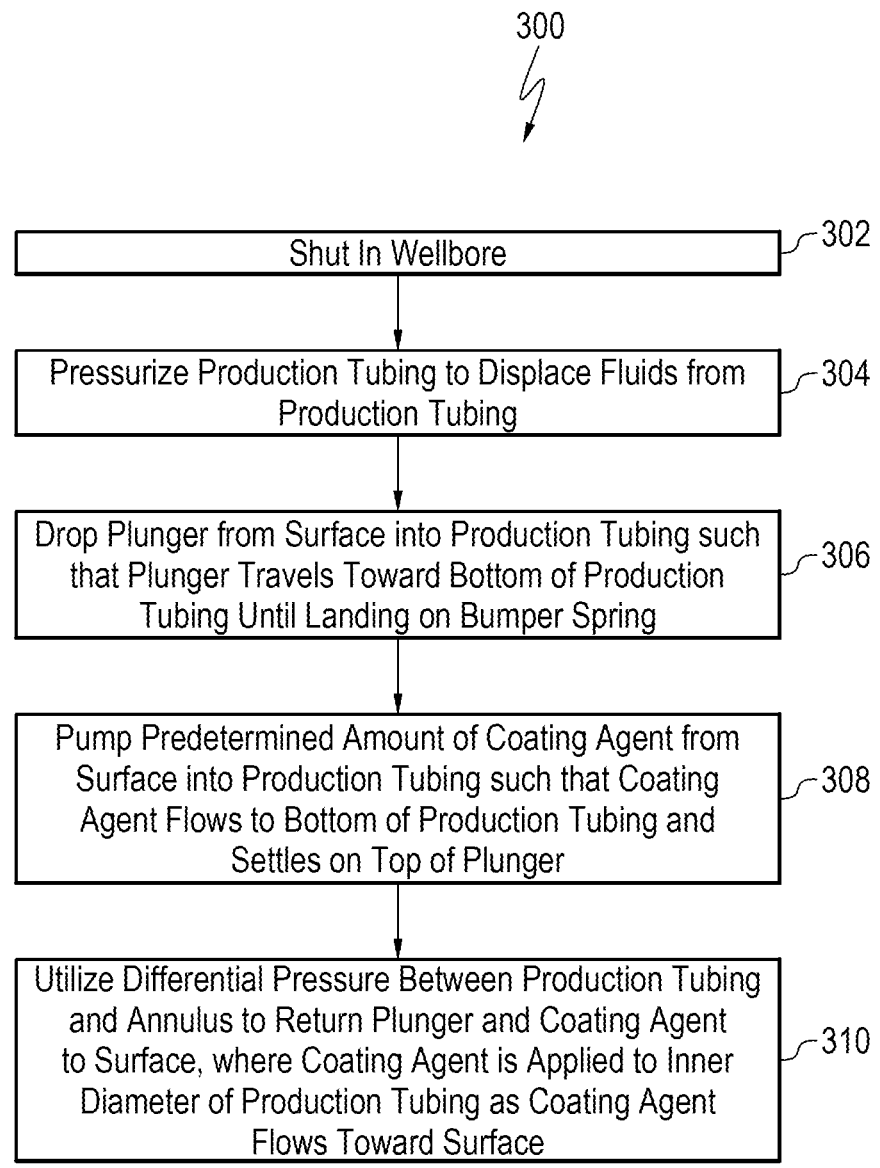
FIG. 3 is process flow diagram of an exemplary method for the in-situ application of a coating agent to production tubing within a wellbore using a plunger lift system.

Exemplary Methods for In-Situ Application of Coating Agents to Production Tubing Within Plunger-Lifted Wells Using Corresponding Plunger Lift Systems FIG. 3 is process flow diagram of an exemplary method 300 for the in-situ application of a coating agent to production tubing within a wellbore using a plunger lift system. The method 300 begins at block 302, at which the wellbore is shut-in. At block 304, the production tubing is pressurized to displace fluids from the production tubing. In some embodiments, this includes applying liquid hydrostatic or gas pressure to the production tubing to displace such fluids.

At block 306, a plunger is dropped from the surface into the production tubing such that the plunger travels toward the bottom of the production tubing until landing on a bumper spring. In some embodiments, the plunger is selected such that the plunger type is designed to maximize the in-situ application of the coating agent to the inner diameter (ID) of the production tubing.

At block 308, a predetermined amount of the coating agent is pumped from the surface into the production tubing such that the coating agent flows to the bottom of the production tubing and settles on top of the plunger. In various embodiments, the coating agent is an omniphobic, low-energy coating material that is effective for preventing and/or mitigating flow assurance issues, such as corrosion and fouling, within tubulars.

At block 310, the differential pressure between the production tubing and the annulus of the wellbore is utilized to return the plunger and the coating agent to the surface, where the coating agent is applied to the ID of the production tubing as the coating agent flows toward the surface. In some embodiments, this includes controlling the differential pressure such that the plunger and the coating agent return to the surface at a predetermined speed. In such embodiments, this may be accomplished by adjusting the amount of time that the wellbore is shut in and/or applying surface choke techniques. Moreover, for embodiments in which the plunger lift system is a gas-assisted plunger lift system, this may be accomplished using gas lift techniques, as described herein.

Furthermore, in various embodiments, the coating agent is allowed to dry or cure for a predetermined drying/curing time. This drying/curing time may optionally be shortened by injecting dry gas from the surface into the production tubing.

Figure 4:
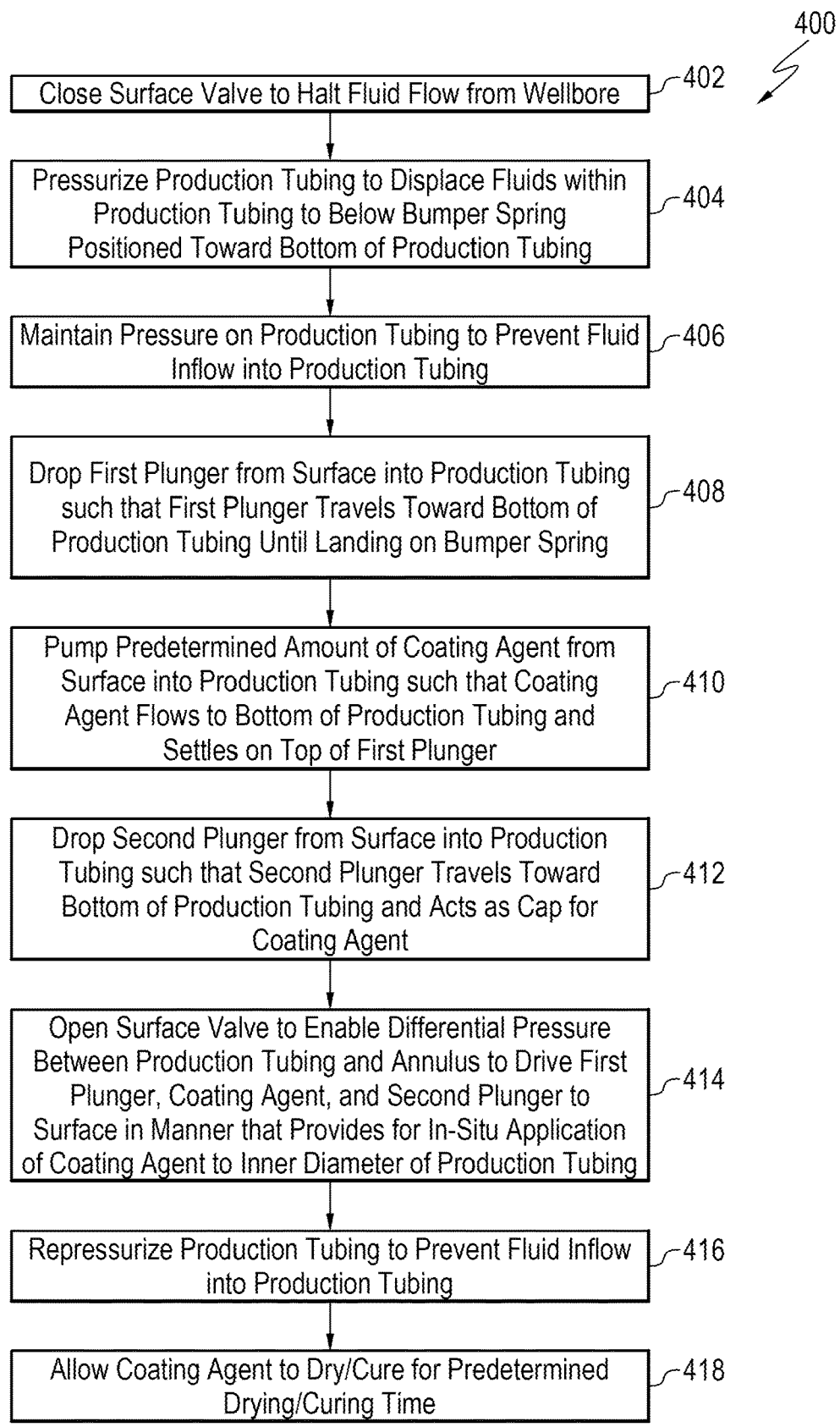
FIG. 4 is process flow diagram of another exemplary method for the in-situ application of a coating agent to production tubing within a wellbore using a plunger lift system.

FIG. 4 is process flow diagram of another exemplary method 400 for the in-situ application of a coating agent to production tubing within a wellbore using a plunger lift system. The method 400 begins at block 402, at which the wellbore's surface valve is closed to halt fluid flow from the wellbore. At block 404, the production tubing is pressurized (e.g., via liquid hydrostatic or gas pressure) to displace fluids within the production tubing to below a bumper spring positioned toward the bottom of the production tubing. At block 406, the pressure is maintained on the production tubing to prevent fluid inflow into the production tubing.

At block 408, a first plunger is dropped from the surface into the production tubing such that the first plunger travels toward the bottom of the production tubing until landing on the bumper spring. In some embodiments, the first plunger is selected such that the plunger type is designed to maximize the in-situ application of the coating agent to the inner diameter of the production tubing.

At block 410, a predetermined amount of the coating agent is pumped from the surface into the production tubing such that the coating agent flows to the bottom of the production tubing and settles on top of the first plunger. In various embodiments, the coating agent is an omniphobic, low-energy coating material that is effective for preventing and/or mitigating flow assurance issues, such as corrosion and fouling, within tubulars.

At block 412, a second plunger is dropped from the surface into the production tubing such that the second plunger travels toward the bottom of the production tubing and acts as a cap for the coating agent. In some embodiments, the second plunger is selected such that the plunger type is designed to maximize the in-situ application of the coating agent to the ID of the production tubing. Moreover, in some embodiments, the second plunger is provided with a higher sealing efficiency and/or a reduced weight to prevent the second plunger from dropping through the coating agent and landing on the first plunger.

At block 414, the surface valve is opened to enable the differential pressure between the production tubing and the annulus of the wellbore to drive the first plunger, the coating agent, and the second plunger to the surface in a manner that provides for the in-situ application of the coating agent to the inner diameter of the production tubing. In some embodiments, this is accomplished by adjusting the amount of time that the wellbore is shut in and/or applying surface choke techniques. Moreover, for embodiments in which the plunger lift system is a gas-assisted plunger lift system, this may be accomplished using gas lift techniques, as described herein.

At block 416, the production tubing is repressurized to prevent fluid inflow into the production tubing. At block 418, the applied coating agent is allowed to dry/cure for a predetermined drying/curing time. Furthermore, in some embodiments, lift gas is circulated through the wellbore to aid in the drying/curing of the coating agent during this predetermined drying/curing time.

The process flow diagrams of FIGS. 3 and 4 are not intended to indicate that the steps of the methods 300 and 400, respectively, are to be executed in any particular order, or that all of the steps of the methods 300 and 400 are to be included in every case. Further, any number of additional steps not shown in FIGS. 3 and 4 may be included within the method 300 or 400, respectively, depending on the details of the specific implementation. As an example, in some embodiments, the methods 300 and/or 400 also include preconditioning the ID of the production tubing before dropping the plunger(s) into the production tubing and/or pumping one or more enhancement fluids into the production tubing before and/or after pumping the predetermined amount of the coating agent from the surface into the production tubing. As another example, in some embodiments, the method 300 includes pumping a buffer of additional fluids into the production tubing rather than pumping a second plunger into the production tubing.

As another example, in some embodiments, the method 300 includes installing a pressure-relieving standing valve below the bumper spring before pressurizing the production tubing to displace the fluids. As yet another example, in some embodiments, the method 300 includes determining a first fluid level within the production tubing using an acoustic device to ensure that the production tubing is clear to a desired depth after pressurizing the production tubing to displace the fluids and/or determining a second fluid level within the production tubing using the acoustic device to ensure that the production tubing is clear to the desired depth after re-pressurizing the production tubing.

According to embodiments described herein, the utilization of the plunger lift system for performing the in-situ coating process is particularly beneficial because it prevents the coating agent from flowing into and potentially damaging the surrounding subsurface formation. Moreover, the utilization of the plunger lift system enables the coating agent to be effectively applied even when the wellbore is not designed to maintain a full column of liquid within the production tubing. However, for embodiments in which such considerations are not of concern, the in-situ coating process may be performed without the utilization of a plunger lift system. For example, in such embodiments, the production tubing may first be pressurized to displace the fluids from the production tubing, and the production tubing may be preconditioned according to embodiments described herein. A pressure-actuated-release plug (such as a pump-out plug) may then be set in the bottom of the production tubing, and the coating agent may be pumped into the production tubing such that it is applied to the inner diameter of the production tubing. The production tubing may then be pressurized (e.g., using lift gas) to a suitable level to pump out the pressure-actuated-release plug, causing the remaining coating agent to flow into the formation. The pressure on the production tubing may then be maintained to prevent fluid inflow into the production tubing, and the coating agent may be allowed to dry/cure for the predetermined drying/curing time, after which time the well may be brought back into production.

In one or more embodiments, the present techniques may be susceptible to various modifications and alternative forms, such as the following embodiments as noted in paragraphs 1 to 20.

1. A method for in-situ application of a coating agent to a production tubing within a wellbore using a plunger lift system, comprising: shutting in the wellbore; pressurizing the production tubing to displace fluids from the production tubing; dropping a plunger from a surface into the production tubing such that the plunger travels toward a bottom of the production tubing until landing on a bumper spring; pumping a predetermined amount of the coating agent from the surface into the production tubing such that the coating agent flows to the bottom of the production tubing and settles on top of the plunger; and utilizing a differential pressure between the production tubing and an annulus of the wellbore to return the plunger and the coating agent to the surface, wherein the coating agent is applied to an inner diameter of the production tubing as the coating agent flows toward the surface.

2. The method of paragraph 1, wherein pressurizing the production tubing to displace the fluids from the production tubing comprises applying liquid hydrostatic or gas pressure to the production tubing to displace the fluids to below the bumper spring.

3. The method of paragraph 1 or 2, comprising pumping a buffer of additional fluids into the production tubing after pumping the predetermined amount of coating agent into the production tubing.

4. The method of paragraph 1 or 2, comprising dropping a second plunger from the surface into the production tubing after pumping the predetermined amount of the coating agent into the production tubing such that the second plunger acts as a cap for the coating agent, and comprising utilizing the differential pressure between the production tubing and the annulus to return the plunger, the second plunger, and the coating agent to the surface.

5. The method of any of paragraphs 1 to 4, wherein utilizing the differential pressure between the production tubing and the annulus to return the plunger and the coating agent to the surface comprises controlling the differential pressure such that the plunger and the coating agent return to the surface at a predetermined speed.

6. The method of paragraph 5, comprising controlling the differential pressure between the production tubing and the annulus by performing at least one of adjusting an amount of time that the wellbore is shut in or applying surface choke techniques.

7. The method of paragraph 5, wherein the plunger lift system is a gas-assisted plunger lift system, and wherein the method comprises controlling the differential pressure between the production tubing and the annulus using gas lift techniques.

8. The method of paragraph 1, comprising allowing the coating agent to dry/cure for a predetermined drying/curing time after the plunger is returned to the surface.

9. The method of paragraph 8, comprising injecting dry gas from the surface into the production tubing to shorten the predetermined drying/curing time.

10. The method of any of paragraphs 1 to 9, comprising performing at least one of: preconditioning the inner diameter of the production tubing before pressurizing the production tubing to displace the fluids; or pumping at least one enhancement fluid into the production tubing before and/or after pumping the predetermined amount of the coating agent from the surface into the production tubing.

11. The method of any of paragraphs 1 to 10, comprising selecting the plunger such that a type of the plunger is designed to maximize the in-situ application of the coating agent to the inner diameter of the production tubing.

12. The method of any of paragraphs 1 to 11, wherein the coating agent comprises an omniphobic, low-energy coating material, and wherein the in-situ application of the coating agent to the inner diameter of the production tubing improves flow assurance for the production tubing by reducing corrosion and fouling within the production tubing.

13. A method for in-situ application of a coating agent to a production tubing within a wellbore using a plunger lift system, comprising: closing a surface valve to halt fluid flow from the wellbore; pressurizing the production tubing to displace fluids within the production tubing to below a bumper spring positioned toward a bottom of the production tubing; maintaining the pressure on the production tubing to prevent fluid inflow into the production tubing; dropping a first plunger from a surface into the production tubing such that the first plunger travels toward a bottom of the production tubing until landing on the bumper spring; pumping a predetermined amount of the coating agent from the surface into the production tubing such that the coating agent flows to the bottom of the production tubing and settles on top of the first plunger; dropping a second plunger from the surface into the production tubing such that the second plunger travels toward the bottom of the production tubing and acts as a cap for the coating agent; opening the surface valve to enable a differential pressure between the production tubing and an annulus of the wellbore to drive the first plunger, the coating agent, and the second plunger to the surface in a manner that provides for in-situ application of the coating agent to an inner diameter of the production tubing; re-pressurizing the production tubing to prevent fluid inflow into the production tubing; and allowing the coating agent to dry/cure for a predetermined drying/curing time.

14. The method of paragraph 13, wherein the plunger lift system is a gas-assisted plunger lift system, and wherein the method comprises at least one of: controlling the differential pressure between the production tubing and the annulus by injecting lift gas into the wellbore prior to opening the surface valve; or circulating lift gas through the wellbore to aid in the drying/curing of the coating agent during the predetermined drying/curing time.

15. The method of paragraph 13 or 14, comprising performing at least one of: preconditioning the inner diameter of the production tubing before pressurizing the production tubing to displace the fluids; or pumping at least one enhancement fluid into the production tubing before and/or after pumping the predetermined amount of the coating agent from the surface into the production tubing.

16. The method of any of paragraphs 13 to 15, comprising controlling the differential pressure between the production tubing and the annulus prior to opening the surface valve by performing at least one of adjusting an amount of time that the wellbore is shut in or applying surface choke techniques.

17. The method of any of paragraphs 13 to 16, comprising installing a pressure-relieving standing valve below the bumper spring before pressurizing the production tubing to displace the fluids.

18. The method of any of paragraphs 13 to 17, comprising performing at least one of: determining a first fluid level within the production tubing using an acoustic device to ensure that the production tubing is clear to a desired depth after pressurizing the production tubing to displace the fluids; or determining a second fluid level within the production tubing using the acoustic device to ensure that the production tubing is clear to the desired depth after re-pressurizing the production tubing.

19. The method of any of paragraphs 13 to 18, comprising, prior to execution of the method, providing the second plunger with at least one of a higher sealing efficiency or a reduced weight to prevent the second plunger from dropping through the coating agent and landing on the first plunger.

20. The method of any of paragraphs 13 to 19, wherein the coating agent comprises an omniphobic, low-energy coating material, and wherein the in-situ application of the coating agent to the inner diameter of the production tubing improves flow assurance for the production tubing by reducing corrosion and fouling within the production tubing.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended on the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. A method for in-situ application of a coating agent to a production tubing within a wellbore using a plunger lift system, comprising:
   shutting in the wellbore;
   pressurizing the production tubing to displace fluids from the production tubing;
   dropping a first plunger from a surface into the production tubing such that the first plunger travels toward a bottom of the production tubing until landing on a bumper spring;
   pumping a predetermined amount of the coating agent from the surface into the production tubing such that the coating agent flows to the bottom of the production tubing and settles on top of the first plunger;
   dropping a second plunger from the surface into the production tubing such that the second plunger acts as a cap for the coating agent; and
   utilizing a differential pressure between the production tubing and an annulus of the wellbore to return the first plunger, the second plunger, and the coating agent to the surface, wherein the coating agent is applied to an inner diameter of the production tubing as the coating agent flows toward the surface.

2. The method of claim 1, wherein pressurizing the production tubing to displace the fluids from the production tubing comprises applying liquid hydrostatic or gas pressure to the production tubing to displace the fluids to below the bumper spring.

3. The method of claim 1, comprising pumping a buffer of additional fluids into the production tubing after pumping the predetermined amount of coating agent into the production tubing.

4. The method of claim 1, wherein utilizing the differential pressure between the production tubing and the annulus to return the first plunger, the second plunger, and the coating agent to the surface comprises controlling the differential pressure such that the first plunger, the second plunger, and the coating agent return to the surface at a predetermined speed.

5. The method of claim 4, comprising controlling the differential pressure between the production tubing and the annulus by adjusting an amount of time that the wellbore is shut in.

6. The method of claim 4, wherein the plunger lift system is a gas-assisted plunger lift system, and wherein the method comprises controlling the differential pressure between the production tubing and the annulus using gas lift techniques.

7. The method of claim 1, comprising allowing the coating agent to dry/cure for a predetermined drying/curing time after the first plunger and the second plunger are returned to the surface.

8. The method of claim 7, comprising injecting dry gas from the surface into the production tubing to shorten the predetermined drying/curing time.

9. The method of claim 1, comprising performing at least one of:
preconditioning the inner diameter of the production tubing before pressurizing the production tubing to displace the fluids; or
pumping at least one enhancement fluid into the production tubing before and/or after pumping the predetermined amount of the coating agent from the surface into the production tubing.

10. A method for in-situ application of a coating agent to a production tubing within a wellbore using a plunger lift system, comprising:
closing a surface valve to halt fluid flow from the wellbore;
pressurizing the production tubing to displace fluids within the production tubing to below a bumper spring positioned toward a bottom of the production tubing;
maintaining the pressure on the production tubing to prevent fluid inflow into the production tubing;
dropping a first plunger from a surface into the production tubing such that the first plunger travels toward a bottom of the production tubing until landing on the bumper spring;
pumping a predetermined amount of the coating agent from the surface into the production tubing such that the coating agent flows to the bottom of the production tubing and settles on top of the first plunger;
dropping a second plunger from the surface into the production tubing such that the second plunger travels toward the bottom of the production tubing and acts as a cap for the coating agent;
opening the surface valve to enable a differential pressure between the production tubing and an annulus of the wellbore to drive the first plunger, the coating agent, and the second plunger to the surface in a manner that provides for in-situ application of the coating agent to an inner diameter of the production tubing;
repressurizing the production tubing to prevent fluid inflow into the production tubing; and
allowing the coating agent to dry/cure for a predetermined drying/curing time.

11. The method of claim 10, wherein the plunger lift system is a gas-assisted plunger lift system, and wherein the method comprises at least one of:
controlling the differential pressure between the production tubing and the annulus by injecting lift gas into the wellbore prior to opening the surface valve; or
circulating lift gas through the wellbore to aid in the drying/curing of the coating agent during the predetermined drying/curing time.

12. The method of claim 10, comprising performing at least one of:
preconditioning the inner diameter of the production tubing before pressurizing the production tubing to displace the fluids; or
pumping at least one enhancement fluid into the production tubing before and/or after pumping the predetermined amount of the coating agent from the surface into the production tubing.

13. The method of claim 10, comprising controlling the differential pressure between the production tubing and the annulus prior to opening the surface valve by adjusting an amount of time that the wellbore is shut in.

14. The method of claim 10, comprising installing a pressure-relieving standing valve below the bumper spring before pressurizing the production tubing to displace the fluids.

15. The method of claim 10, comprising performing at least one of:
determining a first fluid level within the production tubing to ensure that the production tubing is clear to a desired depth after pressurizing the production tubing to displace the fluids; or
determining a second fluid level within the production tubing to ensure that the production tubing is clear to the desired depth after re-pressurizing the production tubing.

16. The method of claim 10, comprising, prior to execution of the method, providing the second plunger with at least one of a higher sealing efficiency or a reduced weight relative to the first plunger to prevent the second plunger from dropping through the coating agent and landing on the first plunger.

* * * * *